(12) United States Patent
Liu

(10) Patent No.: US 9,892,822 B2
(45) Date of Patent: Feb. 13, 2018

(54) SELF-WINDING MODULAR LINEAR UNIT

(71) Applicant: Wen-Cheng Liu, Taipei (TW)

(72) Inventor: Wen-Cheng Liu, Taipei (TW)

( * ) Notice: Subject to any disclaimer, the term of this patent is extended or adjusted under 35 U.S.C. 154(b) by 0 days.

(21) Appl. No.: 15/358,920

(22) Filed: Nov. 22, 2016

(65) Prior Publication Data

US 2017/0148543 A1 May 25, 2017

(30) Foreign Application Priority Data

Nov. 24, 2015 (TW) .............................. 104138986 A

(51) Int. Cl.
| | | |
|---|---|---|
| H01B 7/04 | (2006.01) | |
| H01R 24/60 | (2011.01) | |
| H01B 7/06 | (2006.01) | |
| H01R 107/00 | (2006.01) | |

(52) U.S. Cl.
CPC .............. H01B 7/065 (2013.01); H01B 7/04 (2013.01); H01R 24/60 (2013.01); *H01R 2107/00* (2013.01)

(58) Field of Classification Search
CPC ........... H01B 7/065; H01B 7/04; H01R 24/60
USPC ....................................................... 174/70 R
See application file for complete search history.

(56) References Cited

U.S. PATENT DOCUMENTS

| | | | | | |
|---|---|---|---|---|---|
| 2,888,511 | A | * | 5/1959 | Guritz | H01B 7/06 174/117 R |
| 4,607,746 | A | * | 8/1986 | Stinnette | A61M 25/002 206/363 |
| 5,113,036 | A | * | 5/1992 | Arroyo | G02B 6/4415 138/117 |
| 6,538,205 | B2 | * | 3/2003 | Ueno | H01B 7/0045 174/117 F |
| 6,631,559 | B2 | * | 10/2003 | Ueno | H01B 7/0045 156/51 |
| 6,751,382 | B2 | * | 6/2004 | McGarvey | F16L 3/222 174/168 |
| 6,909,050 | B1 | * | 6/2005 | Bradford | H01B 7/40 174/110 R |
| 8,447,062 | B2 | * | 5/2013 | Lin | H04R 1/1033 381/370 |

FOREIGN PATENT DOCUMENTS

| | | |
|---|---|---|
| TW | M505116 U | 7/2015 |
| TW | M505489 U | 7/2015 |

* cited by examiner

*Primary Examiner* — Timothy Thompson
*Assistant Examiner* — Michael F McAllister
(74) *Attorney, Agent, or Firm* — Muncy, Geissler, Olds & Lowe, P.C.

(57) ABSTRACT

The present invention relates to a self-winding modular linear unit, which comprises: a center connection portion, a left connection portion horizontally connected to the center connection portion, and a right connection portion horizontally connected to the center connection portion, wherein the left connection portion includes a left extending portion extending downwardly from the left connection portion and forming a left connection space with the center connection space. The right connection portion includes a right extending portion extending upwardly from the right connection portion, and forming a right connection space with the center connection portion. When the left extending portion is embedded into the right connection space or the right extending portion is embedded into the left connection space, the present invention achieves self-winding.

5 Claims, 7 Drawing Sheets

SELF-WINDING MODULAR LINEAR UNIT

BACKGROUND OF THE INVENTION

(a) Field of the Invention

The present invention relates to a linear unit, and more particularly to a self-winding modular linear unit that can be self-winding.

(b) Description of the Prior Art

As technology advances, electronic products provide people with considerable convenience, which also makes people become dependent on electronic products such as digital cameras, tablets, and smartphones. People usually go out with these electronic products at hand so that these products are accessible when needed. However, to meet the needs of data transmission or recharging these products, the electronic products that require to be carried at hand include various wires, e.g. USB (Universal Serial Bus) cables and headphone wires. The most general wire storage method is folding the wires several times and then directly putting them into bags, or tying them up with rubber bands or wire binders.

For instance, a Taiwanese Patent with patent number M505489 disclosed a wire storage device that enables users to store wires separately, which solves entanglement problem existing in the prior art. The above-mentioned patent includes a main body, an accommodation area, a notch, and a clamping block. The outer side of the main body is provided with a groove encircling the main body. The accommodation area is disposed at the inner side of the main body, the edge of the accommodation body being provided with a through channel connecting the groove with the accommodation area. The notch is disposed at a side of the main body. The clamping block is disposed at the other side of the main body. When an end of a wire is disposed in the accommodation area, passing through the through channel and entering the groove, the wire can wind along the groove. Via above-mentioned invention, the wires will not get tangled with other objects, and possess the advantage of portability and convenient storage functionality.

In another instance, a Taiwanese patent with patent number M505116 disclosed a power bank with one corner provided with a connection portion for being connected with USB cables; a USB cable with a front end provided with a USB connector, whose back end is connected with a connection device, whose back end is provided with a line structure that is telescopic, wherein the size of the connection portion is slightly larger than said connection portion, said connection device pressing against the connection portion due to its size when the line structure is not pulled, said line structure being an iron axis measuring tape. Via the above-mentioned invention, carrying an extra charging cable around is not necessary, and thus the invention also possesses the advantage of portability.

The above-mentioned prior art inventions can all solve the problems concerning wire storage, avoiding intertwinements between wires, which wastes time when the wires are to be retrieved. However, either the above-mentioned storage device or the utilization of telescopic structure achieves the purpose of storage while both of them force the users to carry wire-storing devices around. Thus, although the above-mentioned prior art inventions solve the wire storage problems, they cause the users extra burden as well since these prior art inventions demand users to carry wire-storing devices. Therefore, it is necessary to improve the prior art inventions.

Accordingly, to solve the above problems in the prior art is the main development objective for the present inventor and companies in the related business.

SUMMARY OF THE INVENTION

Therefore, the present inventor invented the present invention taking into consideration the above-mentioned drawbacks in the prior art inventions, collecting related information, and making continuous attempts and modifications based on various aspects of assessment and considerations, and years of experience in the field.

The present invention provides a self-winding modular linear unit that can be self-winding.

To achieve the above and other objectives, the present invention provides a self-winding modular linear unit, comprising at least: a center connection portion, a left connection portion horizontally connected to the center connection portion, and a right connection portion horizontally connected to the center connection portion;

wherein the left connection portion includes a left extending portion extending downwardly and vertically from the left connection portion, the left extending portion forming a left connection space with the left connection portion and the center connection portion; the right connection portion includes a right extending portion which extends upwardly and vertically from the right connection portion, that is to say, the left connection space and the right connection space each include an opening that is opposite to one another;

when the left extending portion is embedded into the right connection space, or the right extending portion is embedded into the left connection space, the present invention achieves self-winding depending on demand.

According to the aforementioned principal characteristics, an interior of the self-winding modular linear unit is a metallic conductor enclosed by the self-winding modular linear unit, e.g. copper wire as signal line or power line, or non-metallic conductor enclosed by the self-winding modular linear unit, e.g. glass fiber as optical fiber.

According to the aforementioned principal characteristics, the self-winding modular linear unit is a signal line, a power line, a network cable, or an optical fiber cable.

According to the aforementioned principal characteristics, the self-winding modular linear unit is made from flexible insulating material.

According to the aforementioned principal characteristics, the left extending portion is embedded into the right connection space or the right extending portion is embedded into the left connection space, thereby achieving self-winding.

To enable a further understanding of said objectives and the technological methods of the invention herein, a brief description of the drawings is provided below followed by a detailed description of the preferred embodiments.

DETAILED DESCRIPTION OF THE PREFERRED EMBODIMENTS

To achieve the above-described purpose and effects, the technical means and structure adopted by the present invention are elaborated below by describing in detail the features and functionality thereof with reference to the drawings, aiming at making the present invention fully understandable.

Figure 1:
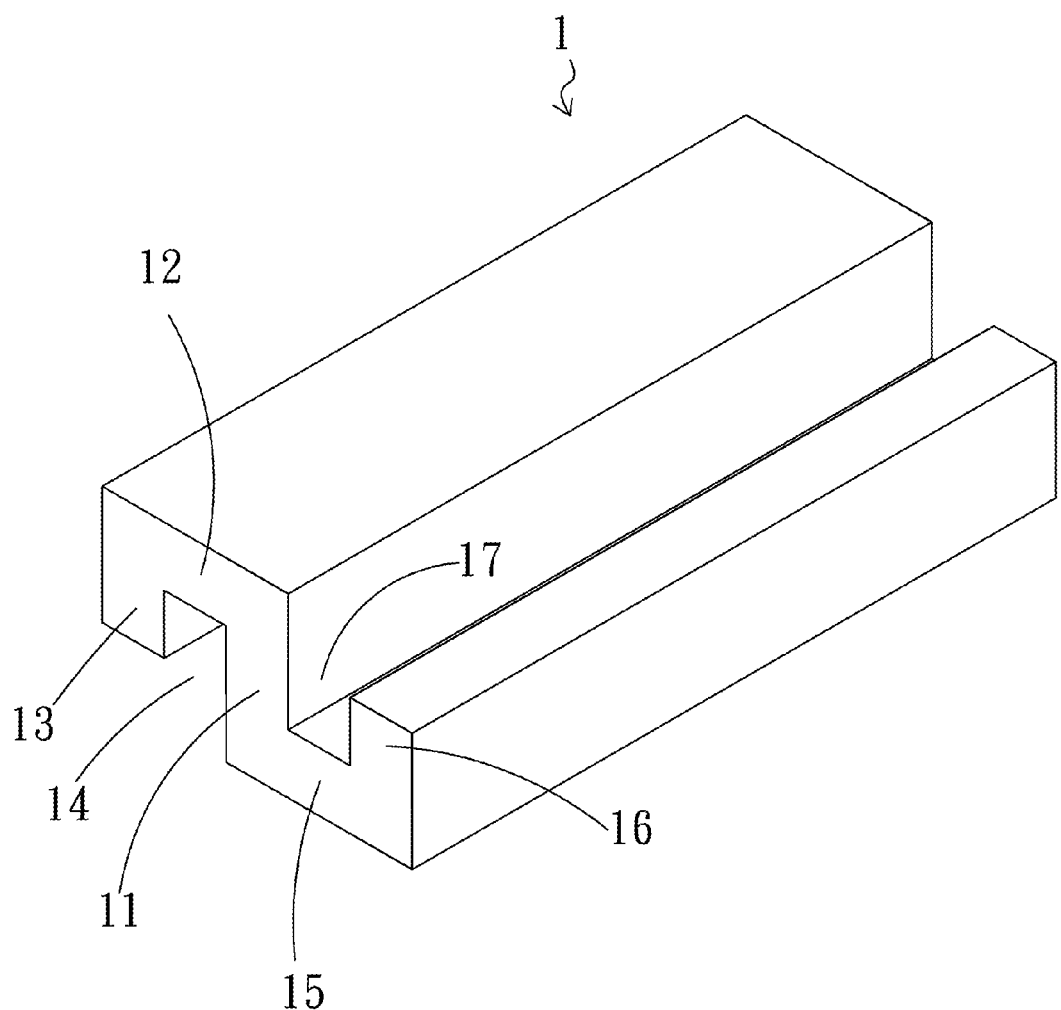
FIG. 1 is a stereogram illustrating a self-winding modular linear unit of the present invention.

Please refer to FIG. 1, which is a stereogram illustrating a self-winding modular linear unit of the present invention. It can be clearly seen from the figure that the present invention provides a self-winding modular linear unit, wherein the linear unit 1 can be a signal line, a power line, a network cable, an optical cable, etc. Therefore, it should be noted that an interior of the self-winding modular linear unit is a metallic conductor, e.g. copper wire, or a non-metallic conductor, e.g. glass fiber, enclosed by the self-winding modular linear unit depending on demand, and the linear unit 1 is made from flexible and insulating material.

The linear unit 1 of the present invention comprises: a center connection portion 11, a left connection portion 12 disposed at an upper end of the center connection portion, and a right connection portion 15 horizontally disposed at an bottom end of the central connecting portion, wherein the left connection portion 12 is horizontally connected to the upper end of the center connection portion 11. More specifically, the left connection portion 12 is horizontally connected to the upper left wall surface of the center connection portion 11. The left connection portion 12 includes a left extending portion 13 extending downwardly from the left connection portion 12, the left extending portion 12 forming a left connection space 14 with the left connection portion 12 and the center connection portion 11. That is to say, the left connection space 14 is a space surrounded by the left extending portion 13, the left connection portion 12, and the center connection portion 11.

The right connection portion 15 is connected to the bottom right wall surface of the center connection portion 11. The right connection portion includes a right extending portion 16 extending upwardly from the right connection portion, the right extending portion 16, the right connection portion 15, and the center connection portion 11 forming a right connection space 17. That is to say, the right connection space 17 is a space surrounded by the right extending portion 16, the right connection portion 15, and the center connection portion 11.

Figure 2:
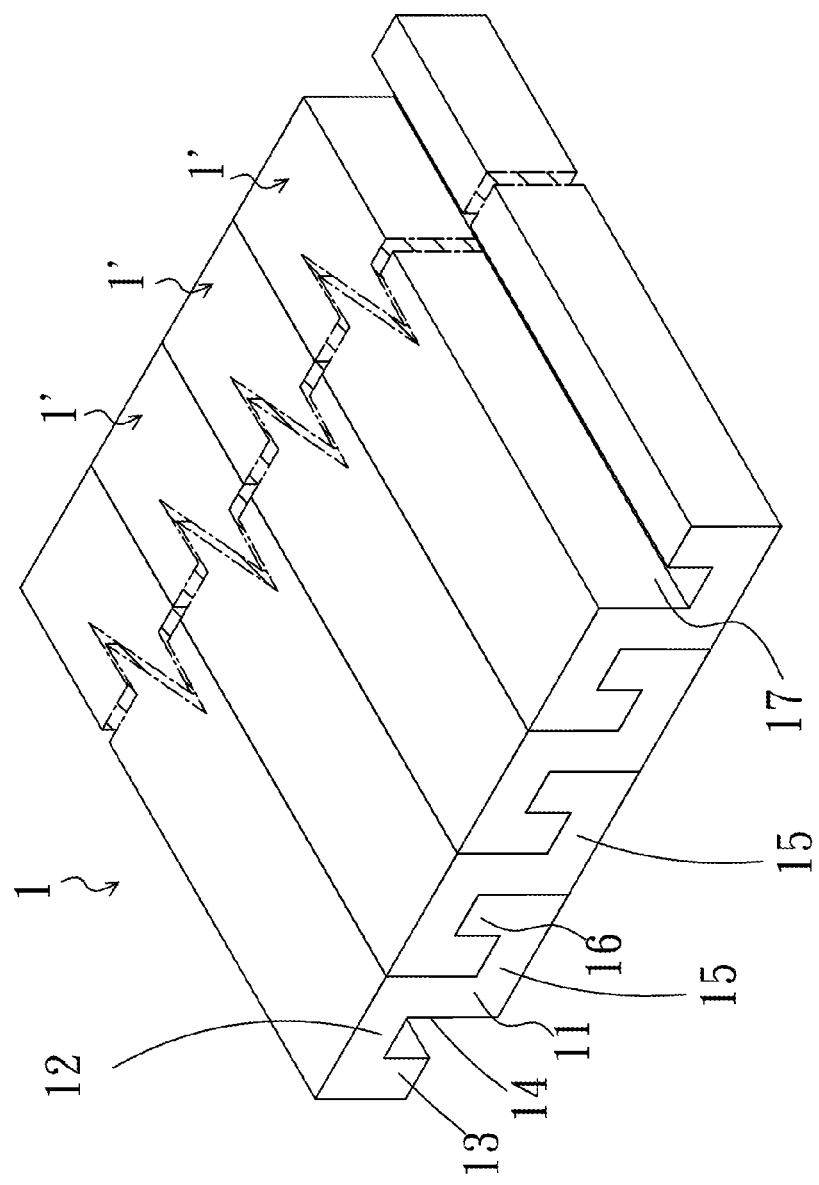
FIG. 2 is a stereoscopic assembled view of a self-winding modular linear unit of the present invention, illustrating a plurality of the self-winding modular linear units stacked in a row to form a wire organizer.
Figure 3:
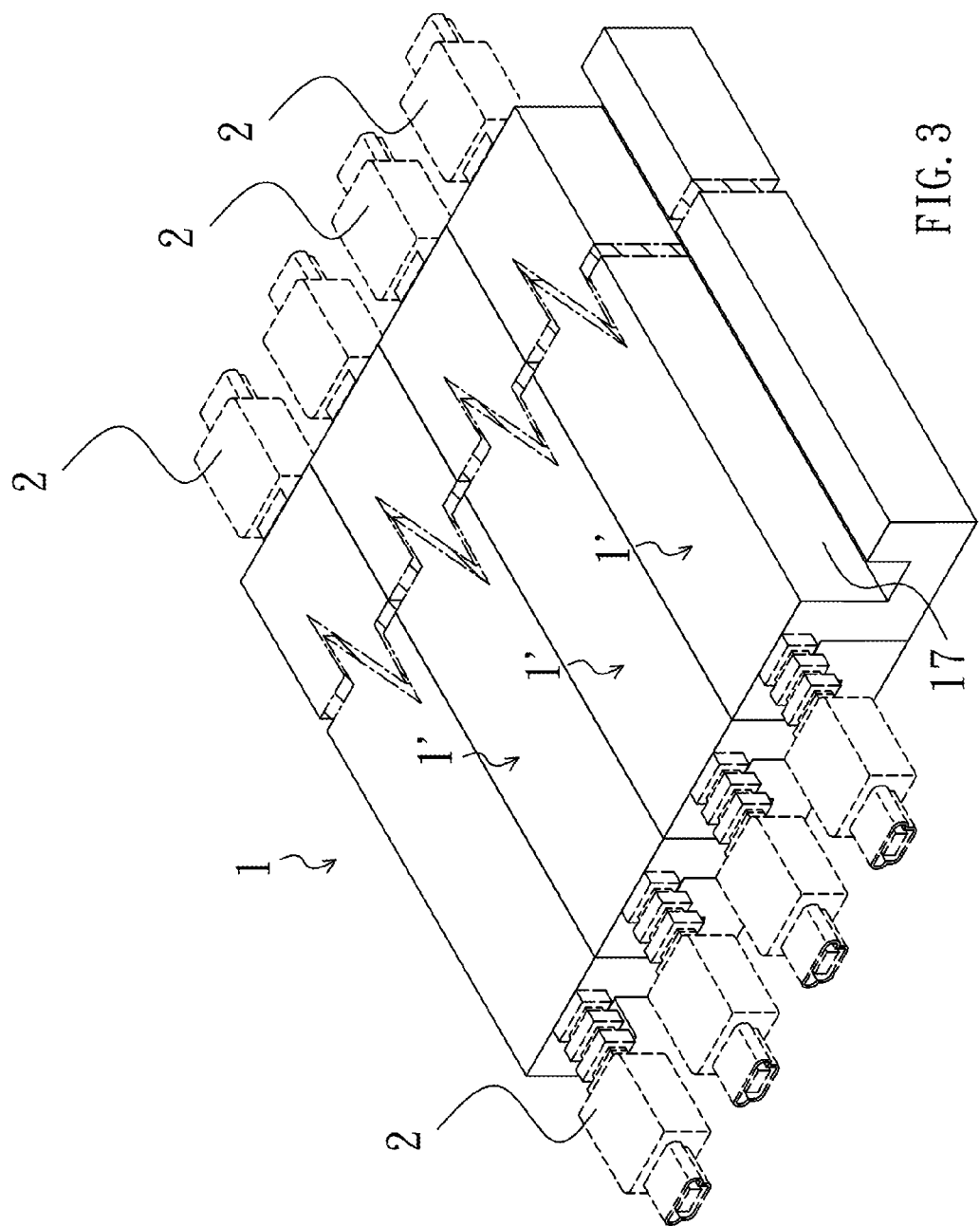
FIG. 3 is a stereoscopic assembled view of the self-winding modular linear unit according to one preferred embodiment of the present invention, illustrating a plurality of the self-winding modular linear unit provided as USB signal lines stacked in a row to form a wire organizer.

The implementation of the present invention is explained below via the above-described structure and composition. Please refer to FIG. 2 and FIG. 3. FIG. 2 is a stereoscopic assembled view of the self-winding modular linear unit of the present invention, illustrating a plurality of the self-winding modular linear units stacked in a row to form a wire organizer. FIG. 3 is a stereoscopic assembled view of the self-winding modular linear unit according to one preferred embodiment of the present invention, illustrating a plurality of the self-winding modular linear unit provided as USB signal lines stacked in a row to form a wire organize. As can be seen from the above-mentioned figures, the linear unit 1 of the self-winding modular linear unit can be stacked in a row with another linear unit 1' to form a cable. The linear unit 1' defined here has a structure that is identical to that of the linear unit 1, which will not be further explained herein. The combination of the linear unit 1 and the linear unit 1' is performed by embedding the left extending portion 13 of the linear unit 1' into the right connection space 17 of the linear unit 1. Alternatively, the combination can be performed by embedding the left extending portion 13 of the linear unit 1 into the right connection space 17 of the linear unit 1'. Via the above method, the present invention achieves the effect of stacking the linear units in a row to form a wire organizer.

Furthermore, the linear unit 1 can be configured with connectors 2 at both ends thereof depending on demand, wherein the connectors 2 can be USB connectors, AV (Audio and Video) connectors, HDMI (High Definition Multimedia Interface) connectors, network connectors, or television signal line connectors (not shown in the drawings.) However, the present invention is not limited to this. The type of the connectors is subject to the users' needs.

Figure 6:
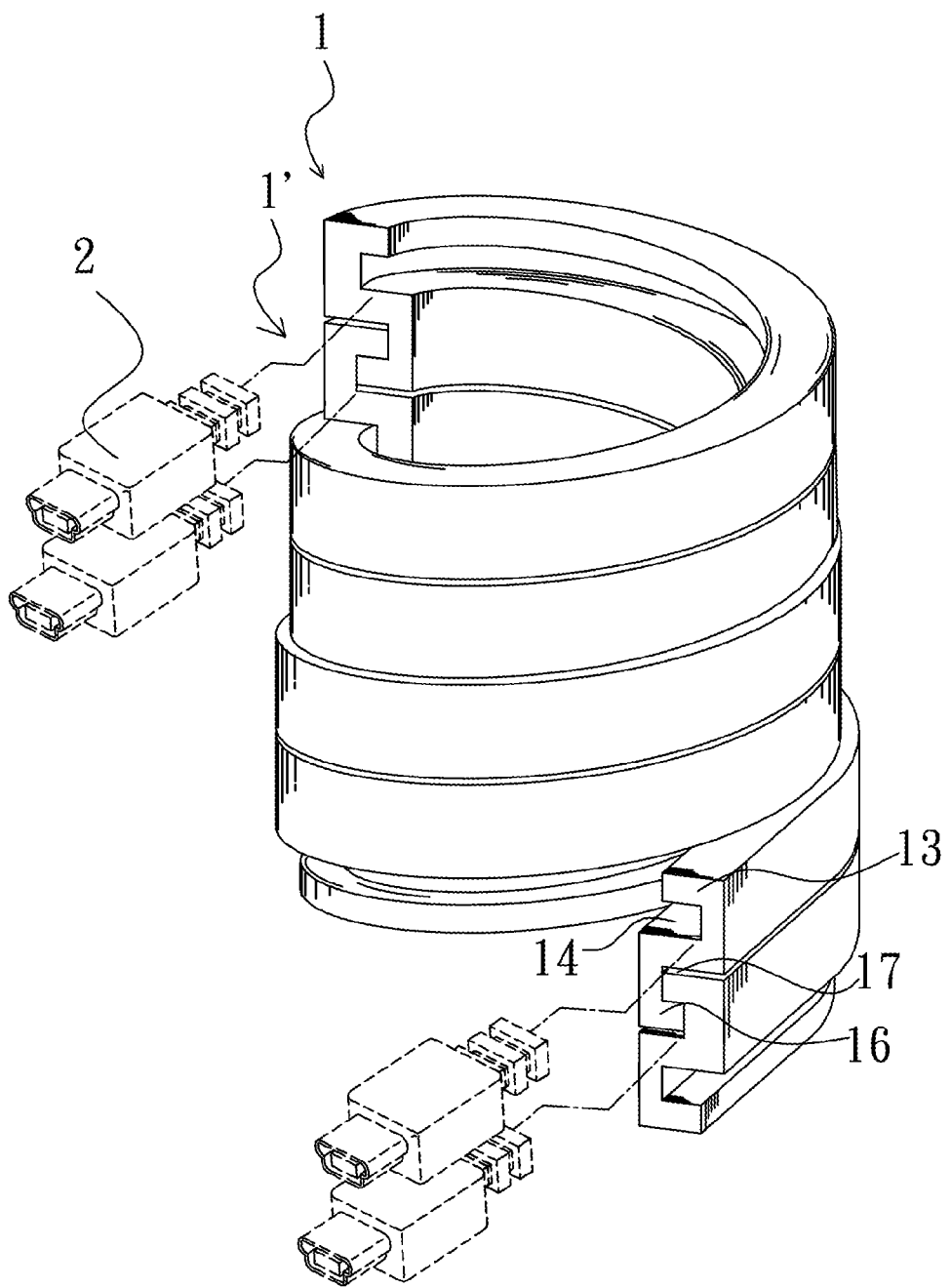
FIG. 6 is a stereogram of a plurality of linear units of the self-winding modular linear units of the present invention being self-winding, illustrating two linear units stacked in a row to form a wire organizer and at the same time self-winding.
Figure 7:
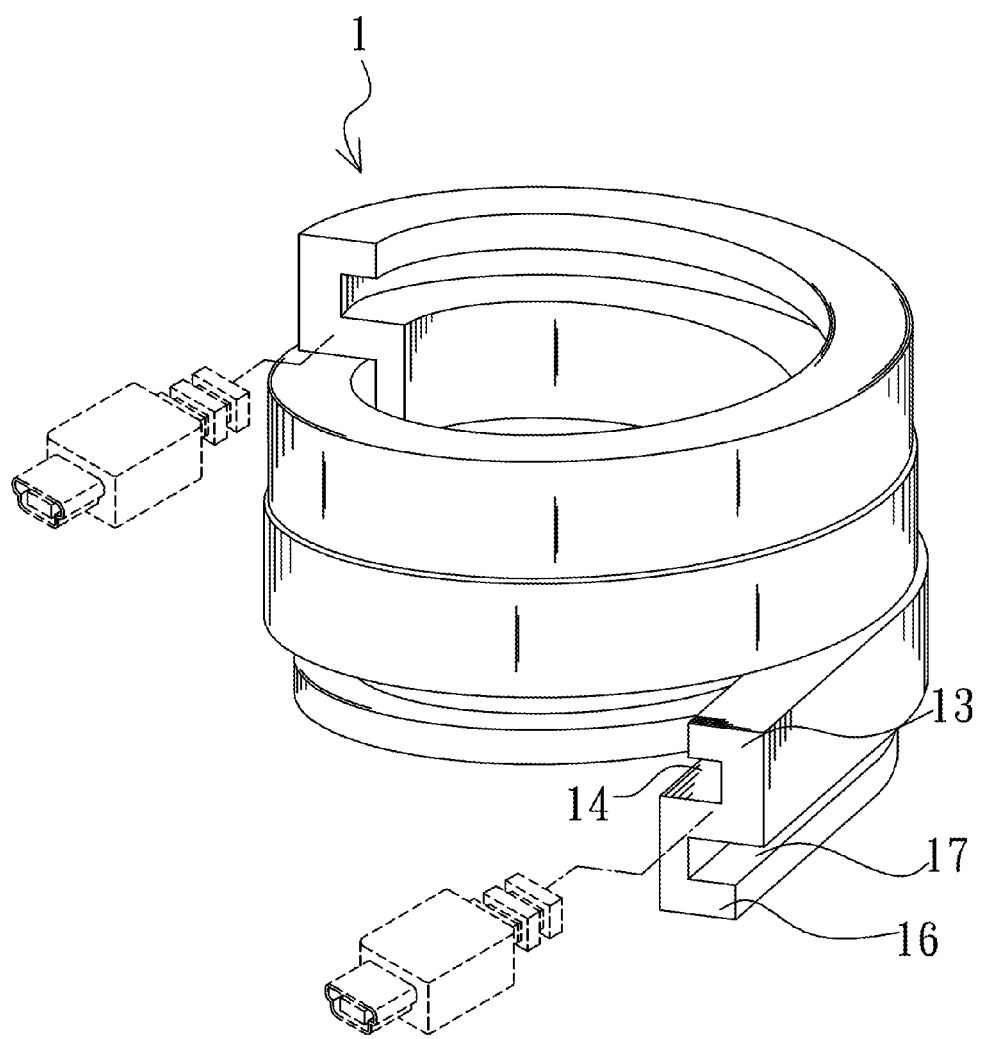
FIG. 7 is a stereogram of a single linear unit of the self-winding modular linear unit of the present invention being self-winding, illustrating one single linear unit stacked together to form a wire organizer and at the same time self-winding.

Please refer to FIG. 6 and FIG. 7. FIG. 6 is a stereogram of a plurality of linear units of the self-winding modular linear units of the present invention being self-winding, illustrating two linear units stacked in a row to form a wire organizer and at the same time self-winding. FIG. 7 is a stereogram of a single linear unit of the self-winding modular linear unit of the present invention being self-winding, illustrating one single linear unit stacked together to form a wire organizer and at the same time self-winding.

As can be seen from the above-mentioned figures, the linear unit 1 of the self-winding modular linear unit of the present invention can perform self-winding with one linear unit 1 (as shown in FIG. 7), or perform self-winding with a plurality of linear units which are assembled together (as shown in FIG. 6). When a single linear unit 1 performs self-winding, either end of the linear unit 1 is used as the center of a helicoid at which the left extending portion 13 of the linear unit 1 is embedded into the right connection space 17 of the linear unit 1, from which the linear unit 1 starts self-winding (as shown in FIG. 7). When the linear unit 1 performs self-winding with a plurality of linear units which are assembled together, either end of the wire organizer is used as the center of a helicoid at which the left extending portion 13 of the linear unit 1 is embedded into the right connection space 17 of the linear unit 1', from which the wire organizer starts self-winding (as shown in FIG. 6). Via the above-described method, the present invention achieves the effect of self-winding and thus the convenient way of wire management and enhanced wire portability.

Moreover, both ends of the linear unit 1 can be connected with connectors 2, wherein the connectors 2 can be USB connectors 2, AV connectors 2, HDMI connectors 2, network connectors 2, or television signal line connectors 2. However, the present invention is not limited to this.

Figure 4:
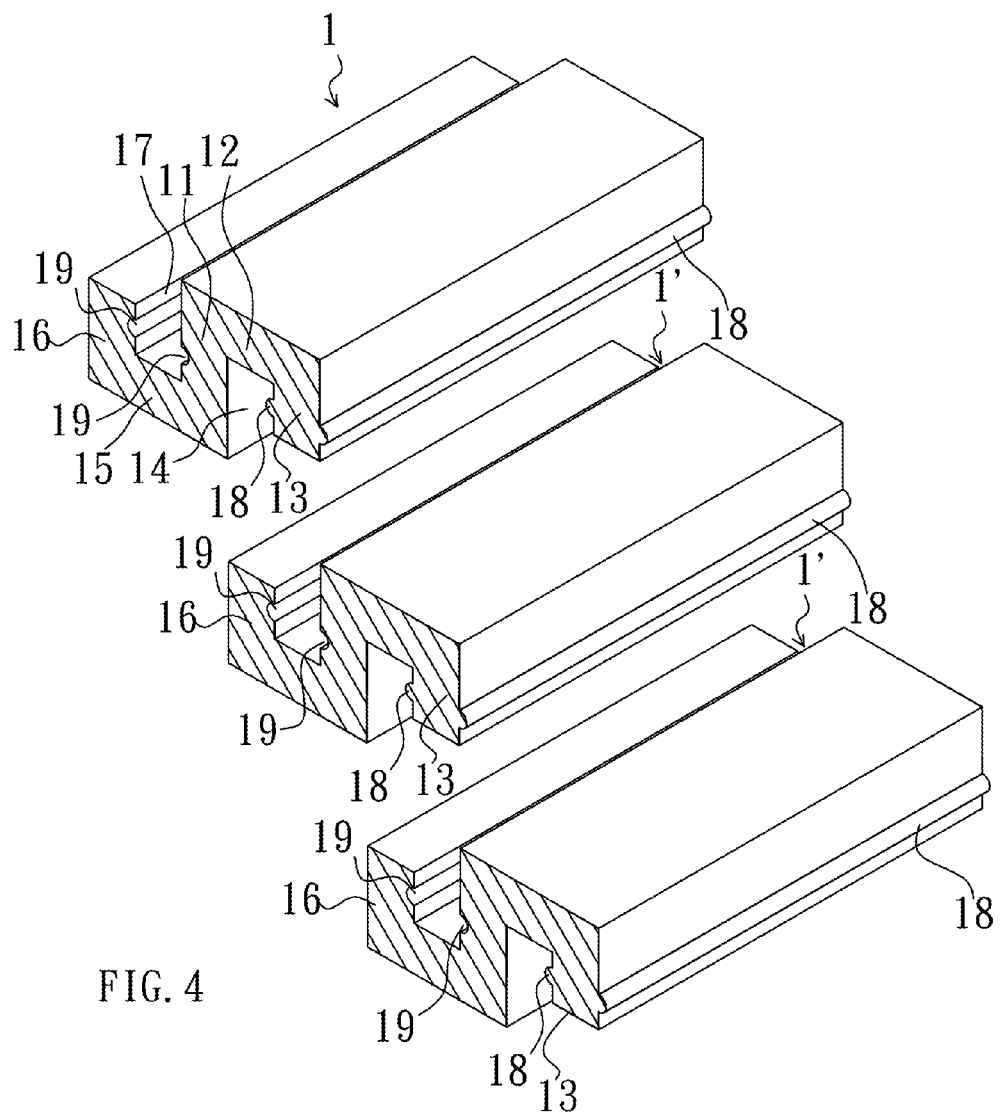
FIG. 4 is a stereoscopic assembled view of the self-winding modular linear unit of the present invention stacked in a row to form a wire organizer, illustrating that each self-winding modular linear unit is provided with a concave structure and a convex structure.
Figure 5:
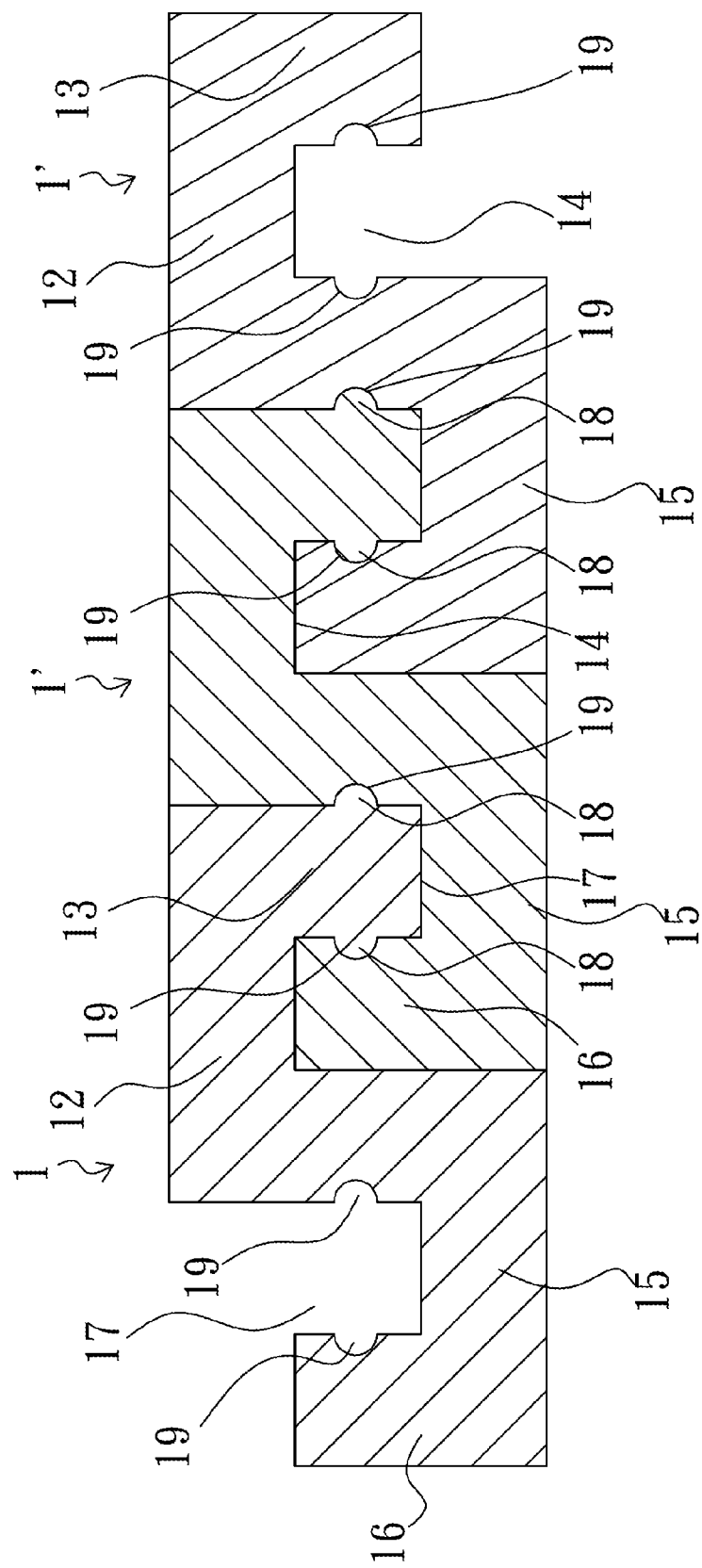
FIG. 5 is a cross-sectional assembled view of the self-winding modular linear unit of the present invention stacked in a row to form a wire organizer, illustrating that each self-winding modular linear unit is provided with a concave structure and a convex structure.

Please refer to FIG. 4 and FIG. 5. FIG. 4 is a stereoscopic assembled view of the self-winding modular linear unit of the present invention, illustrating that each self-winding modular linear unit is provided with a concave structure and a convex structure. FIG. 5 is a cross sectional assembled view of the self-winding modular linear unit of the present invention, illustrating that each self-winding modular linear unit is provided with a concave structure and a convex structure.

The widths of the left extending portion 13 and the right extending portion 16 disclosed in the present invention are slightly smaller than or equal to that of the right connection space 17 and the left connection space 14, and the reasons are as follows: when the left extending portion 13 is embedded into the right connection portion 17 or the right extending portion 16 is embedded into the left connection space 14, the mutual friction force between the left extending portion 13 and the right connection space 17 or between the right extending portion 16 and the left connection space 14 is used to stably connect the left extending portion 13 with the right connection space 17 or connect the right extending portion 16 with the left connection space 14 so that they don't fall apart easily. It can thus be derived from the above description that the linear units 1 and 1' of the present invention are fastened together and prevented from falling apart by utilizing the friction force between the left extending portion 13 and the right connection portion 17, and between the right extending portion 16 and the left connection 14 generated when the left extending portion 13 and the right extending portion 16 are embedded into the corresponding right connection space 17 and the corresponding left connection space 14 respectively. If the linear units 1 and 1' of the present invention are too heavy or with excess lengths, to decrease the insufficient friction force problem that might exist between the left extending portion 13 and the corresponding right connection space 17, and between the right extending portion 16 and the left connection space 14, the left extending portion 13 and the right extending portion 16 can be provided with one or a plurality of convex structures 18, and the corresponding right connection space 17 and the corresponding left connection space 14 can be provided with one or a plurality of concave structures 19 (as shown in FIG. 14) so as to increase the friction force between each extending portions 13 and 16 and the corresponding connection spaces 17 and 14 (as shown in FIG. 5).

Therefore, with reference to all the appended drawings, when being used, the present invention is advantageous over the prior art inventions for: the self-winding modular linear unit 1 of the present invention can be self-winding.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A self-winding modular linear unit, comprising at least:
a center connection portion;
a left connection portion horizontally disposed at an upper end of the center connection portion; and
a right connection portion horizontally disposed at an bottom end of the central connecting portion,
wherein the left connection portion includes a left extending portion extending downwardly from the left connection portion, the left extending portion forming a left connection space with the left connection portion and the center connection portion, and
the right connection portion includes a right extending portion which extends upwardly from the right connection portion and is able to be embedded into the left connection space, the right extending portion, the right connection portion, and the center connection portion forming a right connection space so that the left extending portion can be embedded into the right connection space,
wherein the left extending portion and the right connection space are respectively provided with a convex structure and a concave structure, or the right extending portion and the left connection space are respectively provided with a convex structure and a concave structure.

2. The self-winding modular linear unit as claimed in claim 1, wherein the self-winding modular linear unit is a signal line, a power line, a network cable, or an optical fiber cable.

3. The self-winding modular linear unit as claimed in claim 1, wherein an interior of the self-winding modular linear unit is a metallic conductor or a non-metallic conductor enclosed by the self-winding modular linear unit.

4. The self-winding modular linear unit as claimed in claim 1, wherein the self-winding modular linear unit is made from flexible insulating material.

5. The self-winding modular linear unit as claimed in claim 1, wherein the self-winding modular linear unit is configured with connectors at both ends thereof.

* * * * *